United States Patent
Takai et al.

(10) Patent No.: US 7,235,937 B2
(45) Date of Patent: Jun. 26, 2007

(54) TRACTION MOTOR CONTROL SYSTEM

(75) Inventors: Takatoshi Takai, Anjo (JP); Takeshi Ito, Nagoya (JP); Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/218,489

(22) Filed: Sep. 6, 2005

(65) Prior Publication Data
US 2006/0061310 A1 Mar. 23, 2006

(30) Foreign Application Priority Data
Sep. 21, 2004 (JP) ............................. 2004-273919

(51) Int. Cl.
*H02P 1/00* (2006.01)

(52) U.S. Cl. ...................... 318/139; 318/635; 318/806; 318/432; 318/504

(58) Field of Classification Search ................ 318/139, 318/635, 806, 812, 432, 504; 326/83; 361/18
See application file for complete search history.

(56) References Cited

U.S. PATENT DOCUMENTS 6,175,252 B1 * 1/2001 Yamada ....................... 326/83

6,747,855 B2 * 6/2004 Kumar et al. ................ 361/18

FOREIGN PATENT DOCUMENTS

JP      A 2003-9573     1/2003

OTHER PUBLICATIONS

U.S. Appl. No. 11/146,155, filed Jun. 7, 2005, Takai et al.

* cited by examiner

*Primary Examiner*—Karen Masih
(74) *Attorney, Agent, or Firm*—Oliff & Berridge, PLC

(57) ABSTRACT

For controlling a traction motor of a vehicle, a current command value is determined based on a torque command and a load value representative of running load of the vehicle. A voltage command value is calculated in such a manner that a difference between the current command value and the actual current of the motor is converged to zero. An allowable range is determined for the voltage command value based on the load value and physical quantity associated with an operating condition of the motor. The voltage command value is compared with the lower and upper limits of the allowable range. A safeguard is set on the voltage command value when the latter is becoming smaller than the lower limit or greater than the upper limit. Preferably, the current command value is scaled down or scaled up depending on the voltage command value relative to the allowable range.

24 Claims, 14 Drawing Sheets

TRACTION MOTOR CONTROL SYSTEM

CROSS-REFERENCE TO RELATED APPLICATION

This application is based on Japanese Patent Application No. 2004-273919, filed Sep. 21, 2004, which is incorporated herein by reference.

BACKGROUND OF THE INVENTION

1. Field of the Invention

The present invention relates to a control system for regulating a traction motor that generates at least part of the torque of a motor vehicle or a hybrid vehicle.

2. Description of the Related Art

As described in Japanese Patent Publication No. 2003-009573, part or whole torque of a vehicle generated by a traction motor is controlled by regulating its voltage in response to a command signal supplied from a motor ECU (electronic control unit), which provides calculation to generate a current command value and a voltage command value. The current command value is determined based on a torque value supplied from an external ECU and a load value represented by the number of revolutions of the traction motor. The voltage command value is determined by using a feedback control algorithm that reduces the difference between the determined current command value and the actual current of the motor to zero. The voltage command value is supplied to an inverter, where the voltage command value is converted to AC power that drives the traction motor corresponding to the torque command value.

However, if a sudden change occurs in the running load of the vehicle, it can cause excessive slip or lock of the driven wheels, which could result in a loss of vehicle stability.

In a hybrid vehicle, the HV-ECU calculates the necessary torque from accelerator pedal opening, vehicle speed or the number of revolutions (RPM) of the traction motor. The motor ECU receives this calculated torque as a command value and performs a feedback control on the motor current so that it approaches its command value, whereby the traction motor generates a torque corresponding to its torque command value supplied from the HV-ECU. If a sudden change occurs in the running load, the HV-ECU will alter its torque command value in order to compensate for the sudden load change. However, this requires communication between the HV-ECU and the motor ECU and computations, which results in a delay time (typically, 20 milliseconds) and hence a sudden change in the speed of revolutions of the traction motor.

In response to the sudden change in motor speed, the output voltage of the motor and hence the output of the inverter varies rapidly. Eventually, the sudden variation affects the usable lifetime of the battery.

Therefore, a need exists to provide a traction motor control system that assures vehicle stability and avoids sudden change in battery power consumption for extending its lifetime.

SUMMARY OF THE INVENTION

It is therefore an object of the present invention to provide a vehicle-mounted power supply system capable of monitoring a storage battery by keeping its dark current at a minimum.

According to a first aspect of the present invention, there is provided a control system for regulating a voltage supplied to a traction motor of a vehicle, comprising a current command determiner for determining a current command value of the traction motor based on an externally supplied torque command value and a load value representative of the running load of the vehicle, a voltage command calculator for determining a voltage command value of the motor so that a difference between the current command value and an actual current value of the motor are converged to zero, a range determiner for determining an allowable voltage range having a lower limit and an upper limit based on the load value and physical quantity representing an operating condition of the motor, and safeguard circuitry for comparing the voltage command value with the lower and upper limits and preventing the voltage command value from becoming either smaller than the lower limit or greater than the upper limit.

The physical quantity associated with an operating condition of the traction motor includes externally supplied torque command value, inverter input voltage, voltage utilization rate, a modulation rate, loss, dissipated heat or power that can be supplied to the motor.

If there is a quick drop in vehicle's running load, for example, the traction motor increases its speed, causing the voltage command value to approach the upper limit of the allowable range. When this occurs, the voltage command value is clamped and prevented from becoming higher than the upper limit. As a result, the motor output and hence the battery consumption is quickly restrained at a constant level. Although vehicle driving power is restrained, the traction motor is allowed to continue to increase its speed. Therefore, the vehicle's running stability can be maintained without causing a repeated cycle of acceleration and deceleration. Thus, when the vehicle encounters a sudden load variation, vehicle occupants would not perceive unpleasant feeling.

In a preferred embodiment, the safeguard circuitry generates a current correction value when the voltage command value is becoming either smaller than the lower limit or greater than the upper limit, further comprising a current corrector for correcting the current command value according to the current correction value. The correction of the current command value prevents excessive motor current which would otherwise be caused by a large difference between the actual motor current value and the current command value that occurs at the instant the voltage command value is quickly restrained. The correction of the current command value has the effect of reducing such a difference of current values. Additionally, the voltage command calculator preferably comprises a feedback control circuit for independently generating a d-axis voltage command value and a q-axis voltage command value based on the current command value and actual currents of the traction motor, and a feedforward control circuit for processing the d-axis and q-axis voltage command values using non-interference terms caused by cross-coupled d-axis parameters and q-axis parameters. The use of the non-interference terms allows the feedforward control circuit to determine the voltage command value in a brute force like a "guesswork" approach and then the feedback control circuit starts its feedback operation on the determined voltage command value. Accordingly, the voltage command value is able to return to the allowable voltage range without delay which would otherwise occur as a result of the correction of the current command value in response to a sudden load variation of the vehicle.

The safeguard circuitry preferably controls the corrected current command value when the voltage command value returns to the allowable voltage range by causing the corrected current command value to gradually approach a value which was attained at the instant the voltage command value was becoming smaller than the lower limit or greater than the upper limit. This prevents the voltage command value from changing violently when the system returns to normal if the corrected current command value would otherwise make a quick return to the value which was attained at the instant the voltage command value was becoming smaller than the lower limit or greater than the upper limit.

Further, the safeguard circuitry preferably controls the current command value by setting an initial value of the current command value equal to the actual current value at the instant the voltage command value is becoming smaller than the lower limit or greater than the upper limit, and further controls the current command value when the voltage command value returns to the allowable voltage range by causing the current command value to gradually approach a value which was attained at the instant the voltage command value was becoming smaller than the lower limit or greater than the upper limit. This prevents the voltage command value from changing violently when the system returns to normal if the current command value would otherwise make a quick return to the original value, even if the current command value deviates from it significantly.

According to a second aspect of the present invention, there is provided a method of regulating a voltage supplied to a traction motor of a vehicle, comprising the steps of determining a current command value of the traction motor based on a torque command value and a load value representative of running load of the vehicle, calculating a voltage command value of the motor so that a difference between the current command value and an actual current value of the traction motor is converged to zero, determining an allowable voltage range having a lower limit value and an upper limit value based on the load value and physical quantity associated with an operating condition of the motor, and comparing the voltage command value with the lower limit value and the upper limit value and setting a safeguard on the voltage command value when the voltage command value is becoming either smaller than the lower limit value or greater than the upper limit value.

BRIEF DESCRIPTION OF THE DRAWINGS

The present invention will be described in detail with reference to the following drawings, in which.

DETAILED DESCRIPTION

Figure 1:
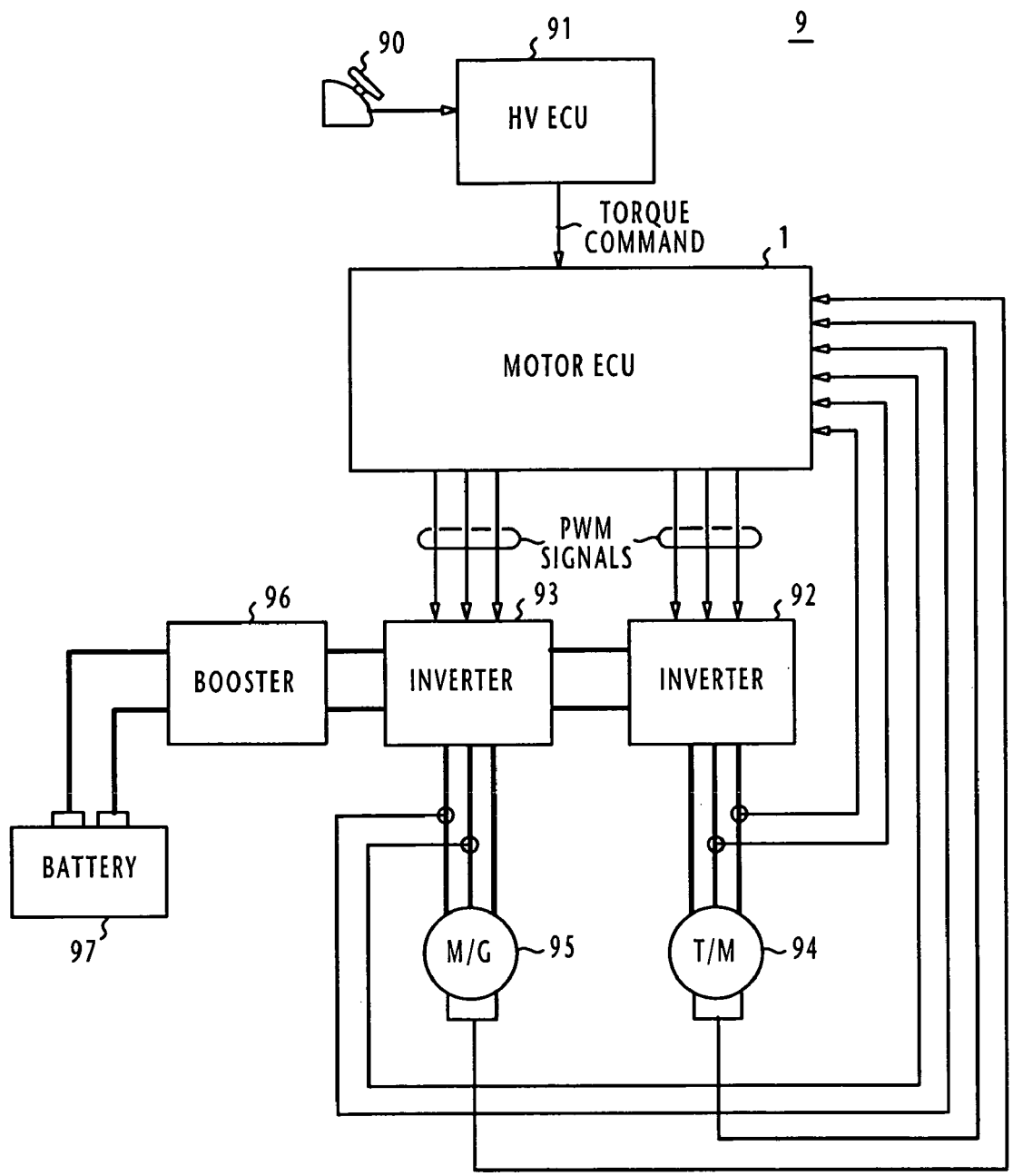
FIG. 1 is a block diagram of a torque control system incorporating a motor ECU of the present invention.

In FIG. 1, there is shown a torque control system according to a first embodiment of the present invention. The torque control system, generally shown at 9, comprises an accelerator pedal 90, a HV-ECU 91, a motor ECU 1, inverters 92, 93, a traction motor 94, a motor-generator 95, a booster 96 and a battery 97.

Booster 96 is connected between the battery 97 and the inverters 92, 93 for boosting the battery voltage of about 300 volts to about 700 volts and supplies the boosted voltage to the inverters 92, 93.

Inverter 92 converts the input DC voltage to 3-phase AC voltages and exchanges AC power with the traction motor 94, which is connected to the axle of the vehicle. Traction motor 94 has a permanent magnet rotor having a plurality of pole-pairs and a set of three-phase stator having a U-phase stator coil, a V-phase stator coil and a W-phase stator coil. Traction motor 94 has a d-axis and a q-axis. As will be described later, the d-axis is oriented in the direction of the pole-pairs to be used in connection with feedback control and feedforward control, and the q-axis is oriented at right angles to the d-axis.

Similar to the inverter 92, the inverter 93 converts the DC voltage to 3-phase AC voltages to exchange AC power with the motor-generator 95, which is connected to the engine (not shown).

HV-ECU 91 is provided between the accelerator pedal 90 and the motor ECU 1. Accelerator pedal 90 is provided with an opening sensor (not shown) to provide a signal to the HV-ECU 91 for indicating the amount of driver's pedal effort on the accelerator pedal. Based on the input signal from the accelerator pedal 90 and the driving speed of the vehicle, the HV-ECU 91 calculates a torque command value Trq*. A brake pedal, not shown, may be connected to the HV-ECU 91 to provide a signal indicating the angle of brake application to allow the HV-ECU 91 to produce the torque command value.

Motor ECU 1 receives the torque command value Trq* from the HV-ECU 91 and controls the width of pulses supplied to the inverters 92 and 93 according to a PWM (pulse width modulation) control routine, which will be described later, for regulating the input voltages of the traction motor 94 and the motor-generator 95, so that the traction motor 94 generates a torque that corresponds to the torque command value Trq*.

Figure 2:
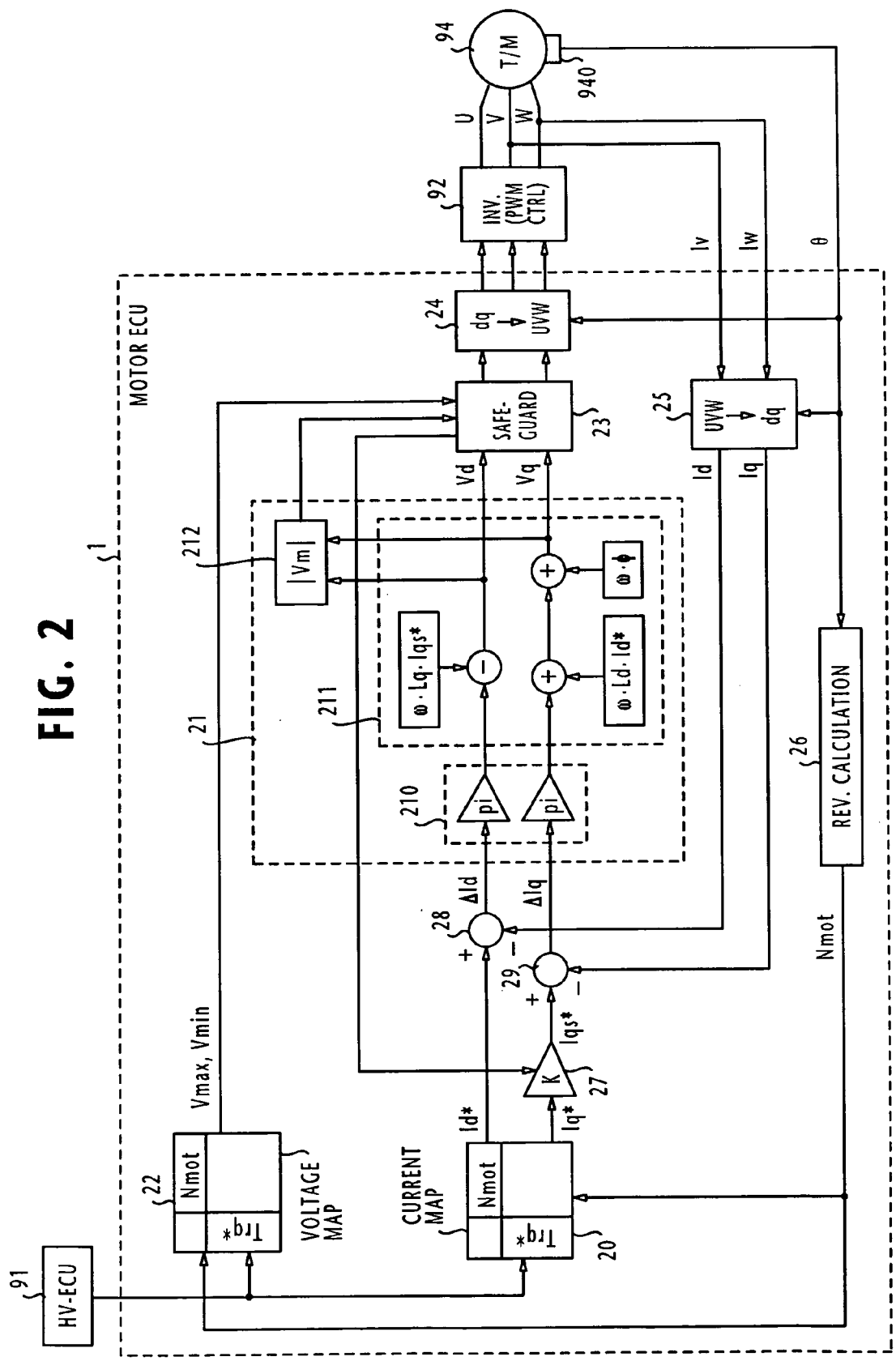
FIG. 2 is a block diagram of the motor ECU of FIG. 1 according to a first embodiment of the present invention.

FIG. 2 shows details of the motor ECU 1. As illustrated, the motor ECU 1 essentially comprises a current command determiner 20, a voltage command calculator 21, an allowable range determiner 22, a voltage safeguard circuit 23, a dq/UVW converter 24, a UVW/dq converter 25, a motor speed sensor 26 and a current command corrector 27.

The UVW/dq converter 25 is supplied with the V-phase current Iv and the W-phase current Iw from the traction motor 94 and calculates the U-phase current Iu=−Iv−Iw and produces a q-axis current Iq and a d-axis current Id, which are the actual currents on the rotating coordinate system.

Motor speed sensor 26, connected to the rotation angle sensor 940 of traction motor 94, calculates the number of revolutions per minute (RPM) of the traction motor 94 from the sensed angle of revolution of its rotor to produce an output signal Nmot indicating the calculated traction motor speed.

Current command determiner 20 is implemented with a mapping table (or current map) in which a plurality of torque command values and a plurality of motor speed values are mapped to a plurality of pairs of predetermined current command values Id* and Iq*. Current command determiner 20 is supplied with an actual torque command Trq* from the HV-ECU 91 and an actual motor speed value from the motor speed sensor 26 as input parameters and determines a pair of the predetermined current command values Id* and Iq* that corresponds to the input parameters. The determined current values Id* and Iq* are delivered from the current map 20 to d-axis and q-axis current paths, respectively.

Allowable range determiner 22 is also implemented with a mapping table (or voltage map) in which a plurality of torque command values and a plurality of motor speed values are mapped to a plurality of pairs of predetermined upper limit value Vmax and lower limit value Vmin. Allowable range determiner 22 is supplied with a torque command value Trq* from the HV-ECU 1 and an actual motor speed value from the motor speed sensor 26 and determines one of the pairs of predetermined voltage limit values, indicating a highest safeguard voltage Vmax of the voltage commands and a lowest safeguard voltage Vmin of the current commands.

Voltage command calculator 21 is comprised of a feedback control circuit 210, a feedforward control circuit 211, and an amplitude calculator 212. Feedback control circuit 210 is connected though q-axis and d-axis current paths to the output terminals of current command determiner 20 to perform proportional (p) and integral (i) gain control using constant Kp and respectively Ki.

In the q-axis current path, the current command value corrector 27 multiplies the current command value Iq* from the current map 20 by a constant K (where K=A or B, 0<A<1, B>1) supplied from the safeguard circuit 23 to produce a weighted current command value Iqs*. The constants A and B respectively indicate that the motor ECU is executing a torque decrement control or torque increment control. When the motor ECU is not executing such torque control, the constant K is set equal to 1 and the weighted current command value Iqs* equals Iq*.

In the d-axis and q-axis current paths, subtractors 28 and 29 are respectively provided. The d-axis subtractor 28 produces a d-axis deviation value ΔId between the d-axis current command value Id* and the q-axis current value Id from the UVW/dq converter 25, and the q-axis subtractor 29 produces a q-axis deviation value ΔIq between the weighted current command value Iqs* and the q-axis current value Iq from the UVW/dq converter 25.

The deviation values ΔId and ΔIq are supplied to the feedback control circuit 210. Calculations are performed on the deviation values ΔId and ΔIq by the feedback control circuit 210 and feedforward control circuit 211 according to Equations (1) and (2) to produce d-axis and q-axis voltage command values Vd and Vq:

$$Vd = Kp \cdot \Delta Id + \Sigma Ki \cdot \Delta Id - \omega \cdot Lq \cdot Iqs^* \quad (1)$$

$$Vq = Kp \cdot \Delta Iq + \Sigma Ki \cdot \Delta Iq + \omega \cdot Ld \cdot Id^* + \omega \cdot \phi \quad (2)$$

where, ω represents the angular velocity of traction motor 94, Ld and Lq represent the inductances of the d-axis and q-axis stator coils of motor 94, and φ is a counter-electromotive force (counter-EMF) constant. When the angular velocity ω is small at low motor speeds, the system is not affected by a non-interference term, while the non-interference term becomes a dominant factor of the system when the traction motor 94 runs at high speeds. Preferably, relatively large Kp and Ki values are selected for low-speed operation and relatively small Kp and Ki values selected for high speed operation. Additionally, when the carrier frequency of the PWM control of the motor ECU is relatively low, the deviation values ΔId and ΔIq are relatively large due to low sampling rate and hence the system is less affected by the non-interference term. When the carrier frequency is relatively high, the deviation values are relatively small and the system is dominated by the non-interference term. Preferably, for proportional gain Kp and integral gain Ki, relatively large values are selected when the carrier frequency is low and relatively small values are selected when the carrier frequency is high.

As described above, the d-axis voltage command value Vd is calculated by Equation (1). The first term (Kp·ΔId) of Equation (1) represents the d-axis proportional term, which is performed in the d-axis proportional control process of feedback control circuit 210 and the second term (ΣKi·ΔId) is the d-axis integral term, which is performed by the d-axis integral control process of feedback control circuit 210. The third term (ω·Lq·Iqs*) of Equation (1) is the non-interference term, which is subtracted from the sum of the first and second terms by the feedforward control circuit 211.

On the other hand, the q-axis voltage command value Vq is calculated by Equation (2). The first and second terms (Kp·ΔIq) and (ΣKi·ΔIq) of Equation (2) are the q-axis proportional and integral terms of feedback control circuit 210. The third and fourth terms (ω·Ld·Id*) and (ω·φ) of Equation (2) are the non-interference terms, which are summed by the feedforward control circuit 211 to the sum of the first and second terms of Equation (2).

Amplitude calculator 212 calculates the following Equation (3) from the voltage command values Vd and Vq to obtain a voltage amplitude |Vm|:

$$|Vm| = \sqrt{Vd^2 + Vq^2} \quad (3)$$

Voltage safeguard circuit 23 is supplied with the voltage amplitude |Vm| and voltage command values Vd and Vq from the voltage command calculator 21 and voltage limit values Vmax and Vin from the voltage map 22. Voltage safeguard circuit 23 compares the voltage amplitude |Vm| with the upper and lower voltage limit values Vmax and Vmin and generates a constant value K according to the result of the comparison and supplies the constant value K to the current command value corrector 27. Depending on the comparison result, the constant value K is equal to the constant A (0<A<1) or B (>1). Safeguard circuit 23 processes the voltage command values Vd and Vq in a manner to be described later for application to the dq/UVW converter 24, The dq/UVW converter 24 converts the input command voltages to 3-phase (U/V/W) AC command voltages and calculates the respective duty ratios of the U-phase, V-phase and W-phase of the AC voltages. Using the calculated duty ratios, the converter 24 performs a PWM (pulse width modulation) control on the inverter 92.

Motor ECU 1 has a torque control execution flag "exe_flag" which is turned ON when torque decrement or increment control is executed or turned OFF when the torque control process is disabled. Further, the motor ECU 1 is provided with a torque control execution counter "exe_cnt" which is set to a count value C when it is determined that the motor ECU was set in a torque control (decrement or increment) mode in a previous cycle. Additionally, the motor ECU has a flag "Vmax_guard" that is turned ON when the voltage amplitude |Vm| exceeds the upper limit Vmax and a flag "Vmin_guard" that is turned ON when the voltage amplitudue |Vm| falls below the lower limit Vmin. Both of these flags "guard" are turned OFF in a manner as described below. Another counter "guard_cnt" is provided in the motor ECU. This counter is set to a count value D when the motor ECU is initially set in a torque control mode.

Before proceeding with the description of the operation of the present invention, it may prove useful to provide a brief explanation of the prior art feedback control circuit in order to appreciate the advantage of the feedback control circuit of the present invention. Prior art feedback control is usually performed according to the following feedback Equations (4), (5):

$$Vd = Kp \cdot \Delta Id + \Sigma Ki \cdot \Delta Id \quad (4)$$

$$Vq = Kp \cdot \Delta Iq + \Sigma Ki \cdot \Delta Iq \quad (5)$$

On the other hand, the traction motor can be equivalently represented the motor Equations (6) and (7) in the rotating coordinate system as follows:

$$V'd = (R + p \cdot Ld) \, Id - \omega \cdot Lq \cdot Iq \quad (6)$$

$$V'q = (R + p \cdot Lq) \, Iq + \omega \cdot Ld \cdot Id + \omega \cdot \phi \quad (7)$$

where, V'd and V'q are motor voltages, R is the resistance of the stator coil and p is the differential operator (=d/dt). From Equations (4) to (7) it can be seen that prior art feedback Equations (4), (5) do not take into account the non-interference terms ($\omega \cdot Lq \cdot Iq$ and $\omega \cdot Ld \cdot Id + \omega \cdot \phi$) of the motor Equations (6), (7). As a result of the absence of non-interference terms, the prior art feedback circuit takes a substantial amount of time to bring the motor voltages to within the appropriate range even by controlling the current command values. Thus, the prior art feedback circuit is not capable of quickly responding to a sudden change in vehicle's running load.

Figure 3A:
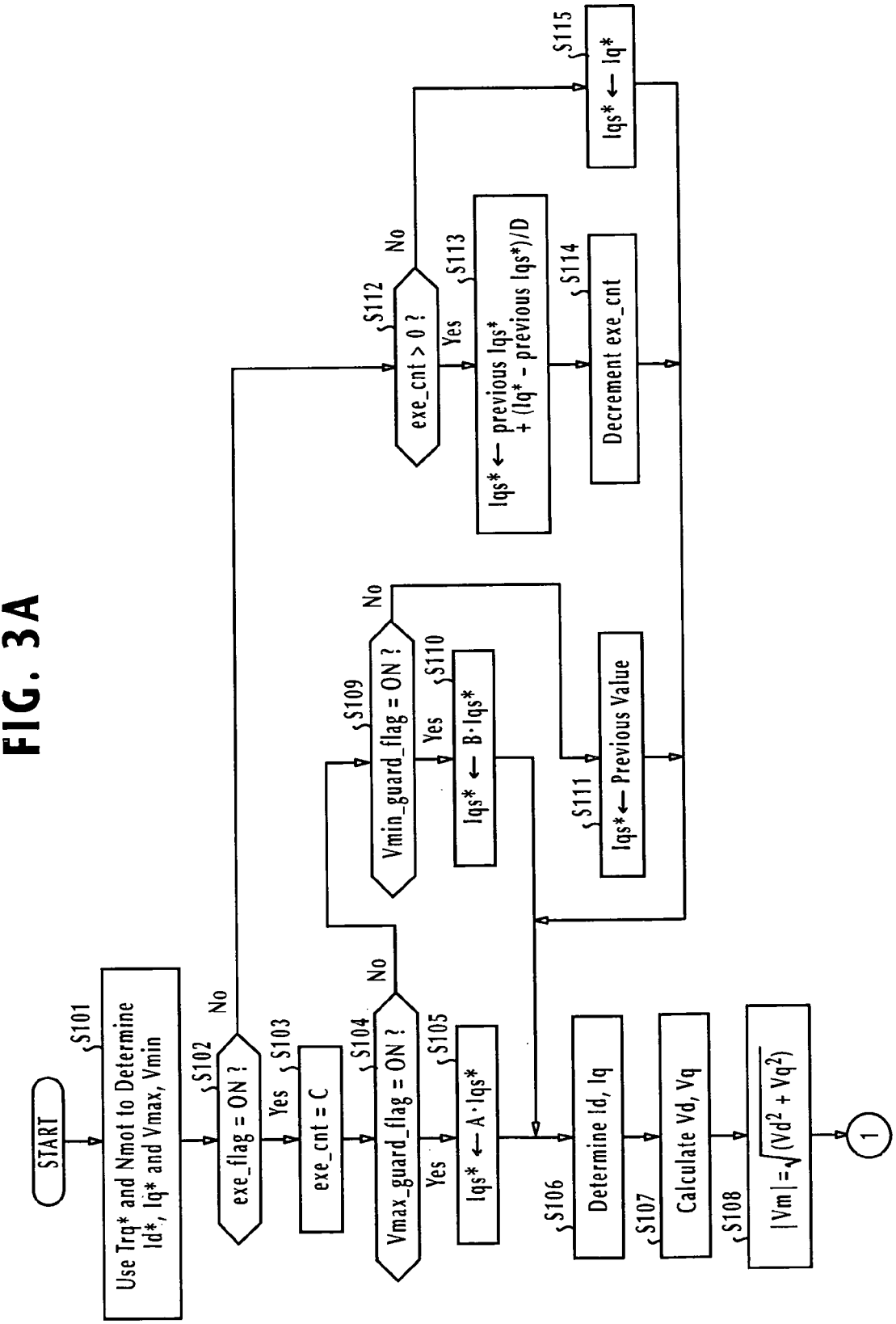
FIGS. 3A and 3B are flowcharts of the operation of the motor ECU of FIG. 2.
Figure 3B:
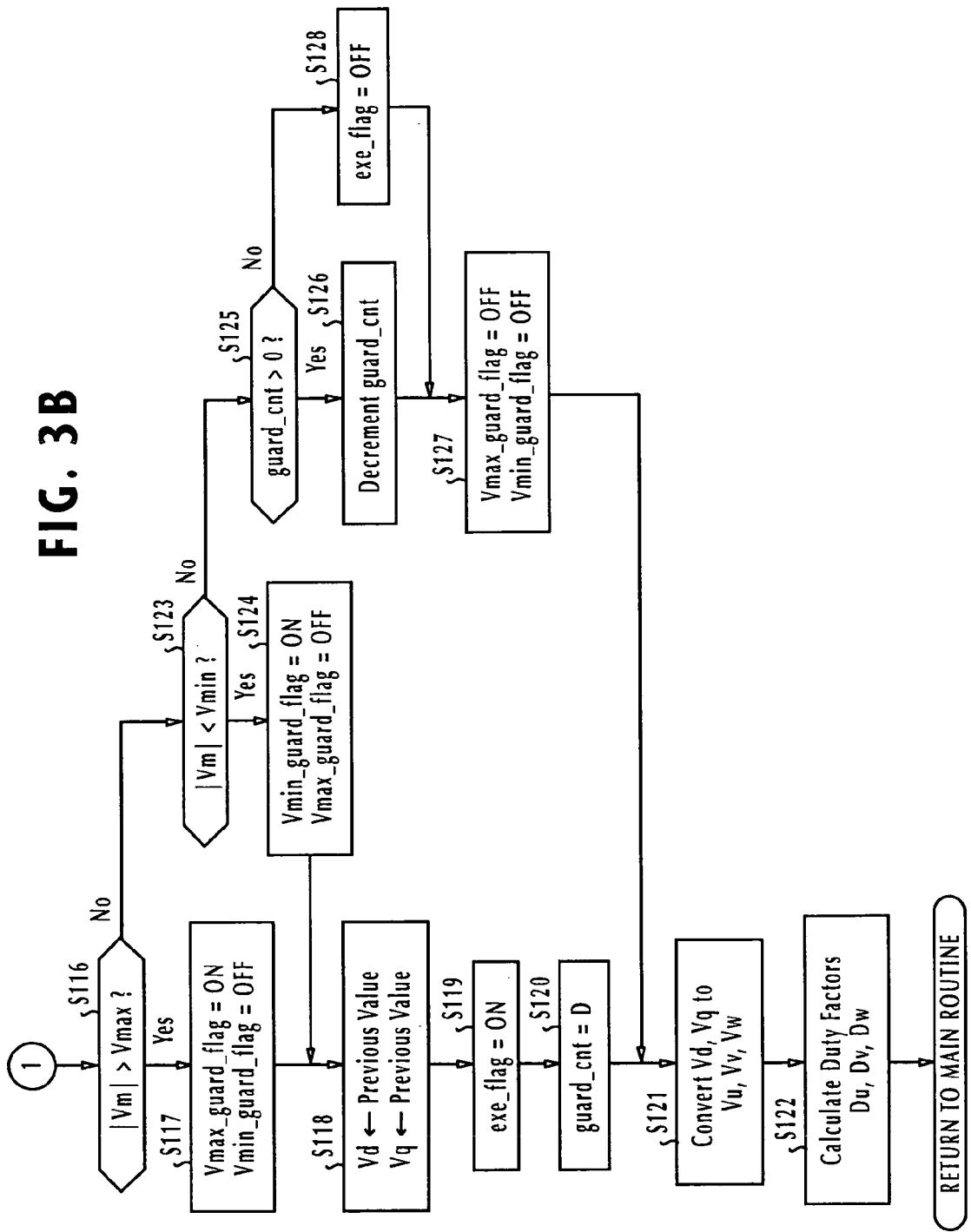

The following is a description of the control routine of the motor ECU with reference to flowcharts shown in FIGS. 3A and 3B. The control routine is repeatedly executed in successive cycles.

The control routine begins with step S101, in which the motor ECU uses the torque command Trq* and the motor speed value Nmot as a search key to read a pair of current command values Id*, Iq* from the current map 20 and a pair of upper and lower limits Vmax, Vmin from the voltage (range) map 22.

At step S102, the motor ECU checks to see if the exe_flag is ON. If the motor ECU is not performing torque decrement/increment control, the decision at step S102 is negative and flow proceeds to decision step S112 to determine if the count value of counter "exe_cnt" is greater than zero. If not, flow proceeds to step S115 to set Iq* to Iqs*. Thus, the weighted current command value Iqs* is initially equals Iq*.

If the decision at step S102 is affirmative, flow proceeds to step S103 to set the initial count value C into the counter "exe_cnt" and determines whether the Vmax_guard_flag is ON (step S104).

If the Vmax_guard_flag is ON (step S104), the motor ECU is in a torque decrement mode and the safeguard circuit 23 produces a constant A to multiply the previous current command value Iqs* by the constant A and sets the product A×Iqs* as a new current command value (step S105). Since the constant A is smaller than 1, the new current command value Iqs* is smaller than the previous value. In this manner, the torque of the traction motor 94 is decreased.

If the decision at step S104 is negative, flow proceeds to step S109 to check to see if the Vmin_guard_flag is ON. If so, the motor ECU is in a torque increment mode and the safeguard circuit 23 supplies a constant B to the current command corrector 27 to multiply the previous current command value Iqs* by the constant B and sets the product B×Iqs* as a new current command value (step S110). Since the constant B is greater than 1, the new current command value Iqs* is greater than the previous value. In this manner, the torque of the traction motor 94 is increased.

If the decision at step S109 is negative, it is determined that the amplitude value |Vm| lies within the allowable voltage range and the motor ECU uses the previous current correction command Iqs* as a new value (step S111).

If it is determined at step S102 that torque control execution flag is not set to ON, the motor ECU proceeds to step S112 to check the count value of torque control execution counter "exe_cnt" to see if it is greater than 0. If so, flow proceeds to step S113 which performs a "slow-return process" on the q-axis current correction value Iqs* so that it slowly returns to the level of the q-axis current command value Iq* in a manner as will be described in detail later. Specifically, this is achieved by updating the command value Iqs* of the present cycle with its previous value plus down-scaled differential value as follows:

$$Iqs^* \leftarrow \text{Previous } Iqs^* + (Iq^* - \text{previous } Iqs^*)/D$$

where D is a scale-down factor greater than 1.

The exe_cnt counter is then decremented by a predetermined amount (step S114). If the count value "exe_cnt" is not greater than 0, flow proceeds to step S115 to set the current command value Iq* from the current map 20 as an weighted current command value Iqs*.

At step S106, a pair of d- and q-axis currents Id, Iq is determined by the UVW/dq converter 25 by conversion from the U- and W-phase output currents of inverter 92 and then a pair of d- and q-axis voltage command values Vd and Vq is calculated by the voltage command value calculator 21 and supplied to the amplitude calculator 212 and the safeguard circuit 23 (step S107). In response, the amplitude calculator 212 calculates Equation (3) to obtain |Vm| (step S108).

The flags Vmax_guard and Vmin_guard will be weighted according to the flowchart of FIG. 3B.

At step S116, the safeguard circuit 23 compares the amplitude value |Vm| with Vmax. If |Vm| is greater than Vmax, flow proceeds to step S117 to turn ON the Vmax_guard_flag and turn OFF the Vmin_guard_flag, and the previous values of voltage command values are set to Vd and Vq as their new values (step S118). The torque control execution flag "exe" is turned ON (step S119) and the guard counter "guard_cnt" is set to a count value D (step S120).

If |Vm| is smaller than Vmax, flow proceeds from step S116 to step S123 to determine if |Vm| is smaller than Vmin. If so, flow proceeds to step S124 to to turn ON the flag "Vmin_guard" and turn OFF the flag "Vmax_guard", and proceeds to step S119. If |Vm| is greater than Vmin, the motor ECU proceeds from step S123 to step S125 to determine if the count value of counter "guard_cnt" is greater than 0. If this is the case, the counter guard_cnt is decremented by a predetermined amount (step S126) and flags "Vmax_guard" and "Vmin_guard" are both turned OFF (step S127). If the count value of guard counter is not greater than zero, flow proceeds from decision step S125 to step S128 to turn OFF the torque control execution flag "exe" and proceeds to step S127.

Following the execution of step S120 or S127 by the motor ECU, flow proceeds to step S121 in which the dq/UVW converter 24 performs conversion on the outputs Vd, Vq of safeguard 23 to three-phase AC voltages Vu, Vv, Vw. At step S122, the inverter 92 calculates the duty factors Du, Dv, Dw of the three-phase outputs of the converter 24. Flow now returns to the main routine of the motor ECU 1, the description of which is omitted for simplicity.

Figure 4:
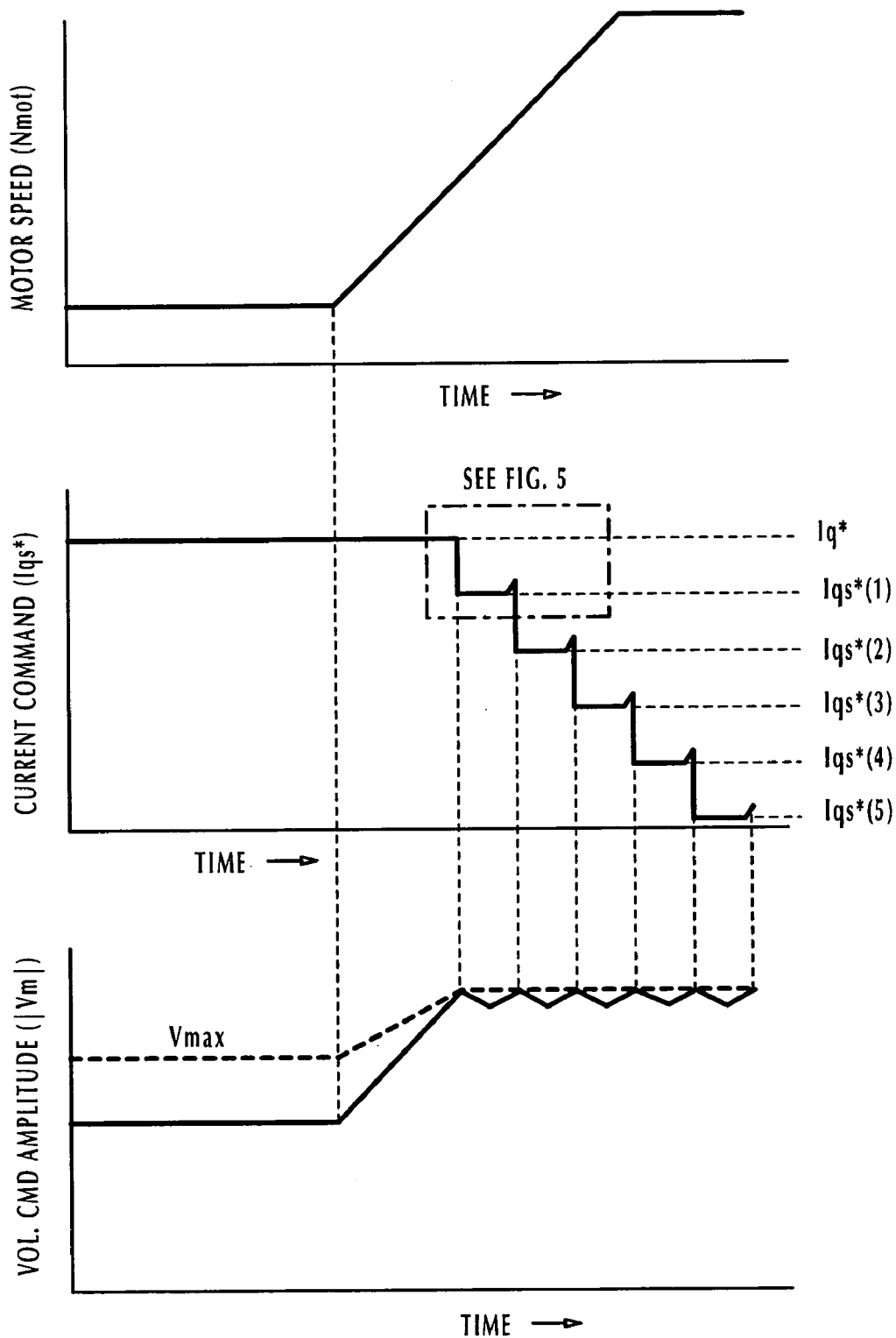
FIG. 4 is a graphic representation of the operating characteristics of the first embodiment of the present invention.

The following is a description of the operation of the motor ECU when the vehicle encounters a sudden drop in running load due to braking, causing a wheel slip off road surface. When this occurs, the speed of traction motor 94 suddenly increases. FIG. 4 is a timing diagram illustrating the traction motor speed value Nmot increasing rapidly when the driven wheels slip off road surface. FIG. 4 shows that with the increasing motor speed, the voltage command amplitude |Vm| is also increasing rapidly with time. The upper limit value Vmax also increases. On the other hand, the current command value Iq* decreases in successive stages. Corresponding to the successive decrements of current command values Iq*, the voltage command amplitude |Vm| varies, following a repeated pattern of rises and falls.

More specifically, when the amplitude |Vm| exceeds the upper limit Vmax, the current command value Iq* is weighted by constant A to produce a weighted current command value Iqs*(1). When this occurs, the amount of decrement in |Vm| due to the decrement from Iq* to Iqs*(1) is greater than the amount of increment in |Vm| due to the increment of motor speed value Nmot. As a result, the voltage command amplitude |Vm| decreases.

When a predetermined amount of time lapses following a decrease in |Vm| (corresponding to step S125, FIG. 3B), the torque decrement control is turned off (see step S128). This results in an increase in the traction motor speed Nmot, and the voltage command amplitude |Vm| starts increasing again. When |Vm| exceeds the upper limit Vmax again, Iqs*(1) is weighted by constant A to produce a new current command value Iqs*(2). As the process is repeated, the current command value is decremented in a stepwise fashion, producing current command values Iqs*(3), Iqs*(4) and Iqs*(5). With this pattern of stepwisely decremented current command values, the voltage command amplitude |Vm| is prevented from exceeding the upper limit Vmax.

When the vehicle encounters a sudden rise in running load, there is a rapid drop in traction motor speed Nmot. In this case, the motor ECU performs a torque increment process, which is inverse to the torque decrement process just described.

The following is a description of the operation of the motor ECU when it returns to normal from the torque decrement mode. When the vehicle returns from a wheel slip to a normal gripping state on road surface, for example, a quick return of the current command value from Iqs* to Iq* would cause an excessive increase in voltages Vd and Vq. Hence, an excessive amount of current flow will be generated in the torque control system 9. This problem is avoided by executing step S113 to gradually restore the weighted current command value Iqs* to the initial command value Iq*.

Figure 5:
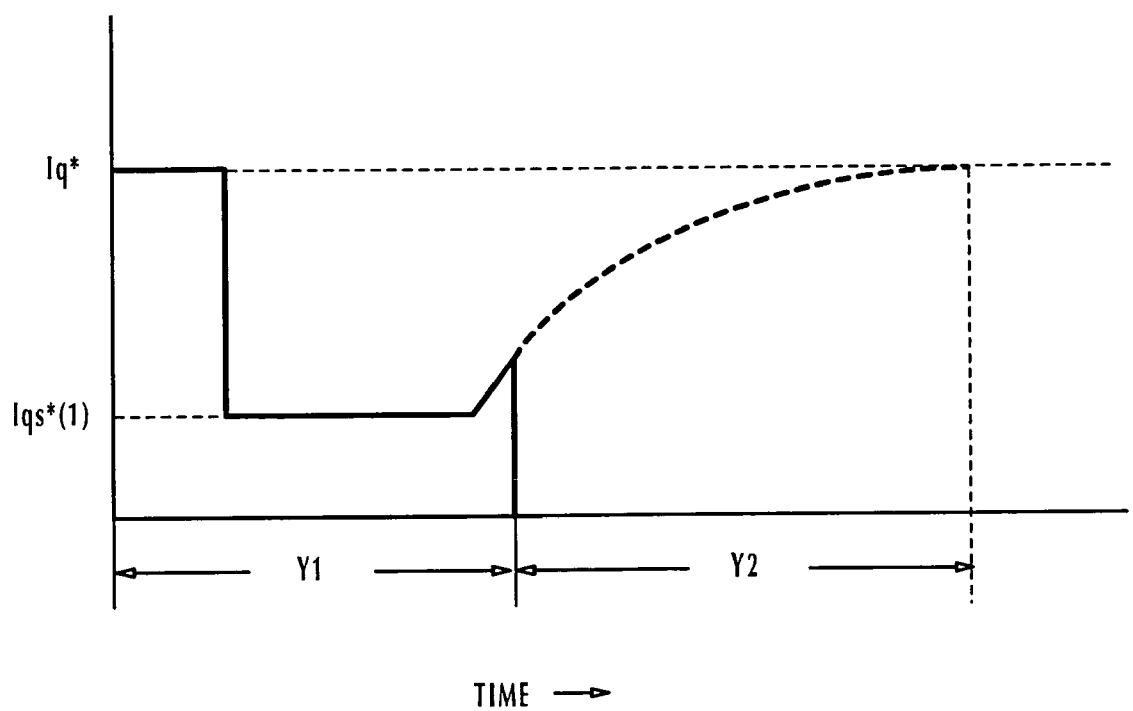
FIG. 5 is an enlarged illustration of a portion of FIG. 4.

A portion of FIG. 4 is shown in detail in FIG. 5 in which time interval Y1 corresponds to the counter guard_cnt>0 (step S125, FIG. 3B). When the torque decrement process ends and the driven wheels grip on road surface, the current command value Iqs*(1) is allowed to slowly return to the initial value Iq*, gradually approaching to Iq* as indicated by a dotted curve, during interval Y2.

Feedforward control 211 allows the feedback control circuit 210 to perform its operation in a brute force manner by "guessing" coarse values for Vd and Vq when a sudden change occurs in running load. Using the coarse values of motor voltages, the feedback control circuit 210 can quickly respond to sudden load variations.

Figure 6:
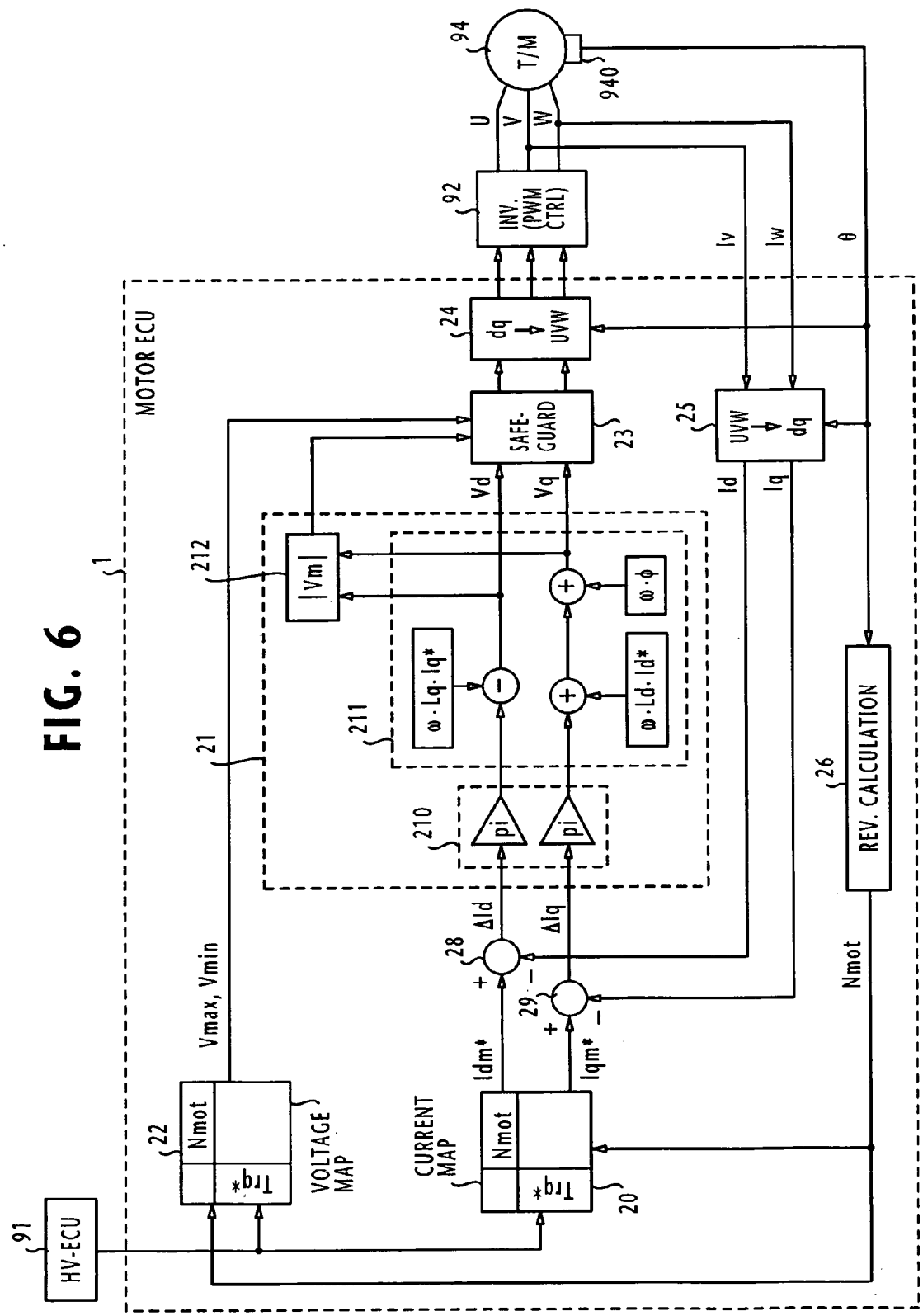
FIG. 6 is a block diagram of the motor ECU according to a second embodiment of the present invention.

FIG. 6 is a block diagram of a second embodiment of this invention, which differs from the previous embodiment in that the corrector 27 is dispensed with and the current map 20 maintains current command values designated Idm* and Iqm*, instead of the designations Id*, Iq* of the previous embodiment. Motor ECU 1 of FIG. 6 operates according to the flowcharts of FIGS. 7A and 7B. Instead of using two guard flags for upper and lower voltage limits, only one flag "guard_flag" is used in the second embodiment to indicate that, when that flag is ON, the motor ECE is operating in a safeguard mode to execute a torque control process.

Figure 7A:
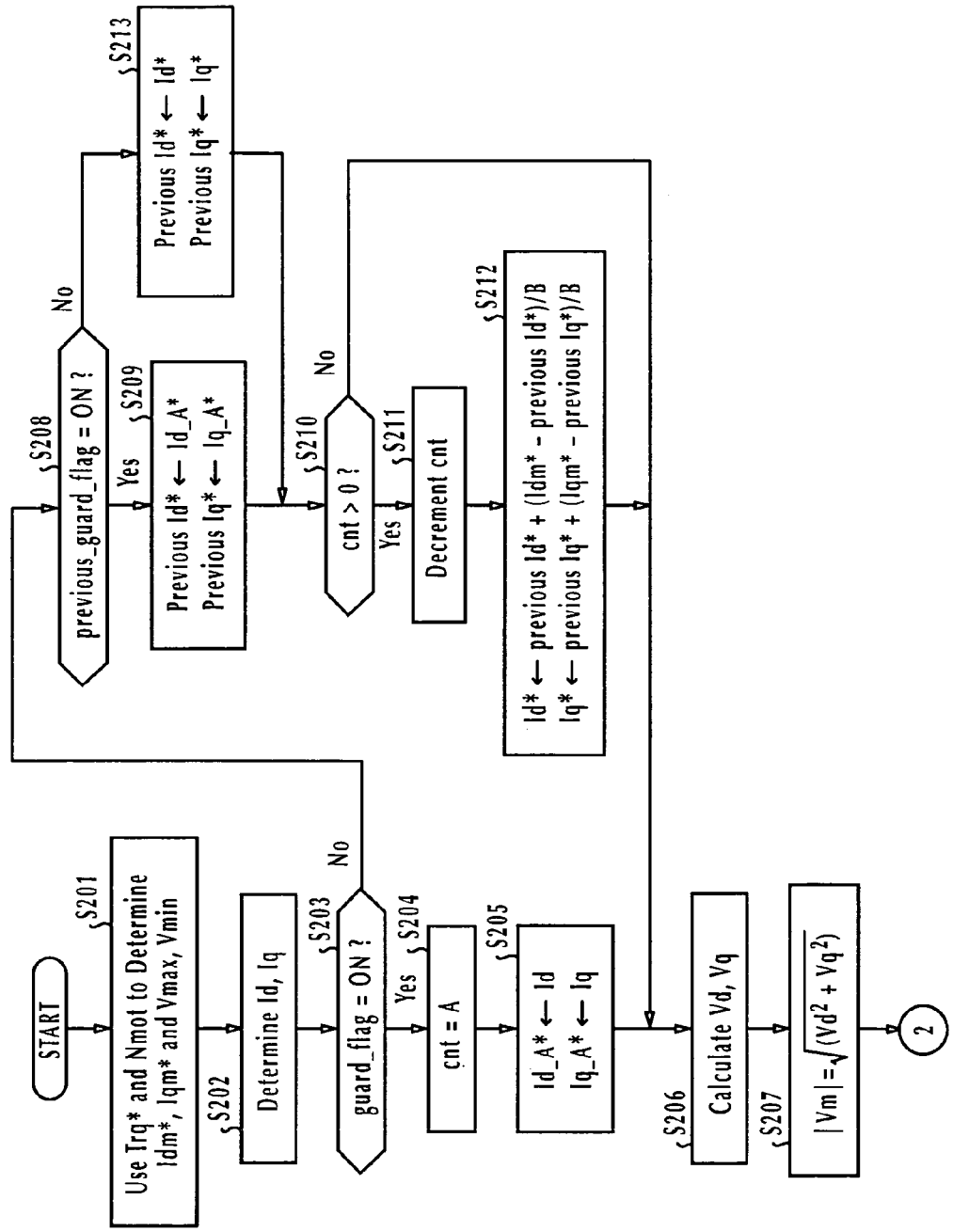
FIGS. 7A and 7B are flowcharts of the operation of the motor ECU of FIG. 6.
Figure 7B:
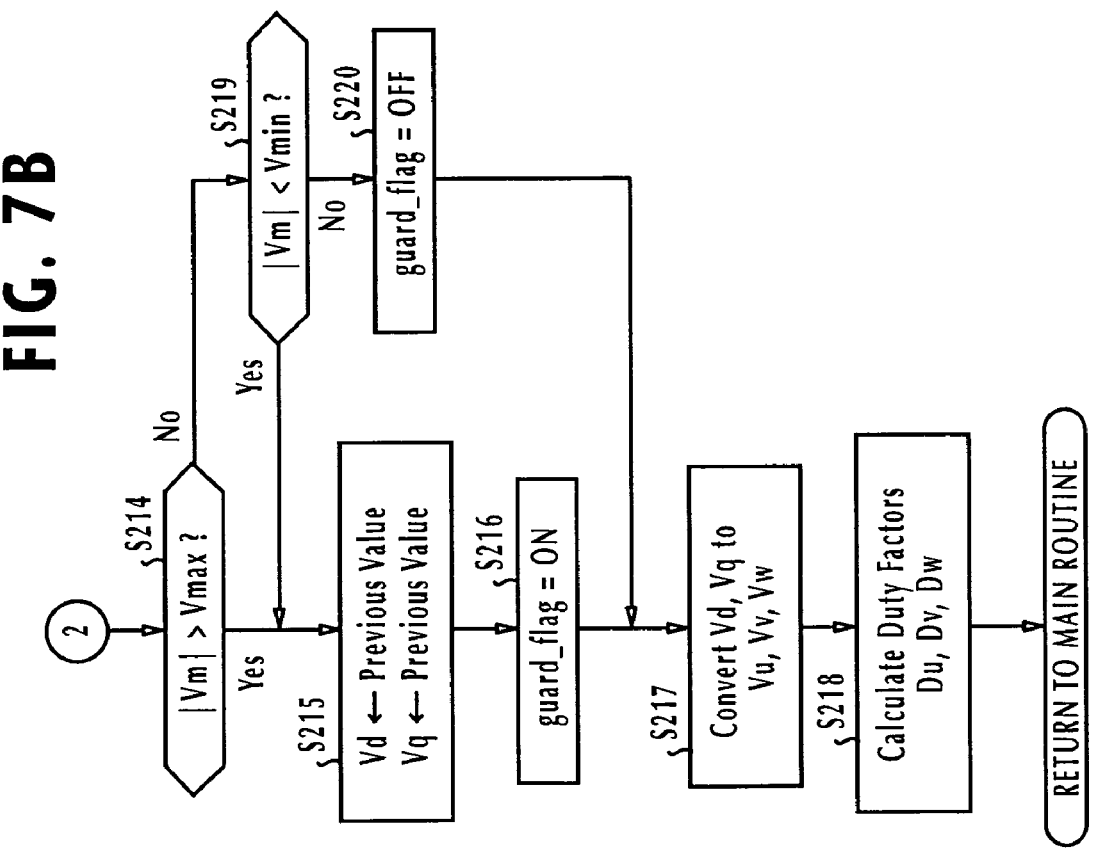

In FIGS. 7A and 7B, the control routine of motor ECU 1 begins with step S201 in which the motor ECU uses the torque command Trq* and the motor speed value Nmot as a search key to read a pair of current command values Idm*, Iqm* from the current map 20 and a pair of upper and lower limits Vmax, Vmin from the allowable range map 22.

At step S202, the motor ECU determines motor currents Id and Iq using UVW/dq converter 25, and proceeds to step S203 to determine whether the guard_flag is ON. If so, flow proceeds to step S204 to set a predetermined count value A to a counter "cnt" and, at step S205, the motor ECU updates the current command values Id* and Iq* with the determined motor current values Id and Iq. The updated values Id* and Iq* will be used at the instant the motor ECU 1 returns from the safeguard mode to normal. Therefore, the updated values Id* and Iq* are designated as return-point current command values Id_A* and Iq_A*. Following the execution of step S205, flow proceeds to step S206.

If the decision at step S203 is negative, it indicates that the motor ECU is operating in safeguard mode, and flow proceeds to decision step S208 to determine if the "guard_flag" of the previous routine cycle is ON. If the motor ECU was in a safeguard mode in the previous cycle, the decision at step S208 is affirmative and flow proceeds to step S209 to set the return-point current command values Id_A* and Iq_A* to previous current command values Id* and Iq*. If the decision at step S209 is negative, command values Id* and Iq* of the current routine cycle are set to command values Id* and Iq* which were obtained in the previous cycle.

At step S210, the counter "cnt" is checked if its count value is greater than 0. If this is the case, the counter is decremented by a predetermined amount (step S211). At step S212, a slow-return process is performed by updating command values Id* and Iq* of the present cycle with their previous values plus down-scaled differential values as follows:

$$Id^* \leftarrow \text{Previous } Id^* + (Idm^* - \text{previous } Id^*)/B$$

$$Iq^* \leftarrow \text{Previous } Iq^* + (Iqm^* - \text{previous } Iq^*)/B$$

where B is a scale-down factor greater than 1. With this updating process, the command values Id* and Iq* slowly approaches the original values Idm*, Iqm*. Flow proceeds to step S206. If the decision at step S210 is negative, the updating process is not performed and flow proceeds to step S206.

At step S206, voltage values Vd and Vq are calculated according to Equations (1) and (2) described earlier. Note that in Equation (1), command value Iq* is used instead of Iqs*. At step S207, the voltage command amplitude |Vm| is calculated, and |Vm| is compared with Vmax and Vmin to determine if |Vm| is greater than Vmax (step S214) or smaller than Vmin (step S219). If |Vm| is either greater than Vmax or smaller than Vmin, the routine proceeds to step S215 to update the Vd and Vq calculated in the current routine cycle with their previous values and the guard_flag is turned ON (step S216), indicating that the motor ECU is set in a safeguard mode, with flow proceeding to step S217. If |Vm| is within the range between Vmax and Vmin, the routine proceeds to step S220 to turn OFF the guard_flag, and flow proceeds to step S217.

At step S217, the dq/UVW converter 24 performs conversion on the outputs Vd, Vq of safeguard 23 to three-phase AC voltages Vu, Vv and Vw. At step S218, the inverter 92 calculates the duty factors Du, Dv, Dw of the three-phase outputs of the converter 24 and flow returns to the main routine of the motor ECU 1.

Figure 8:
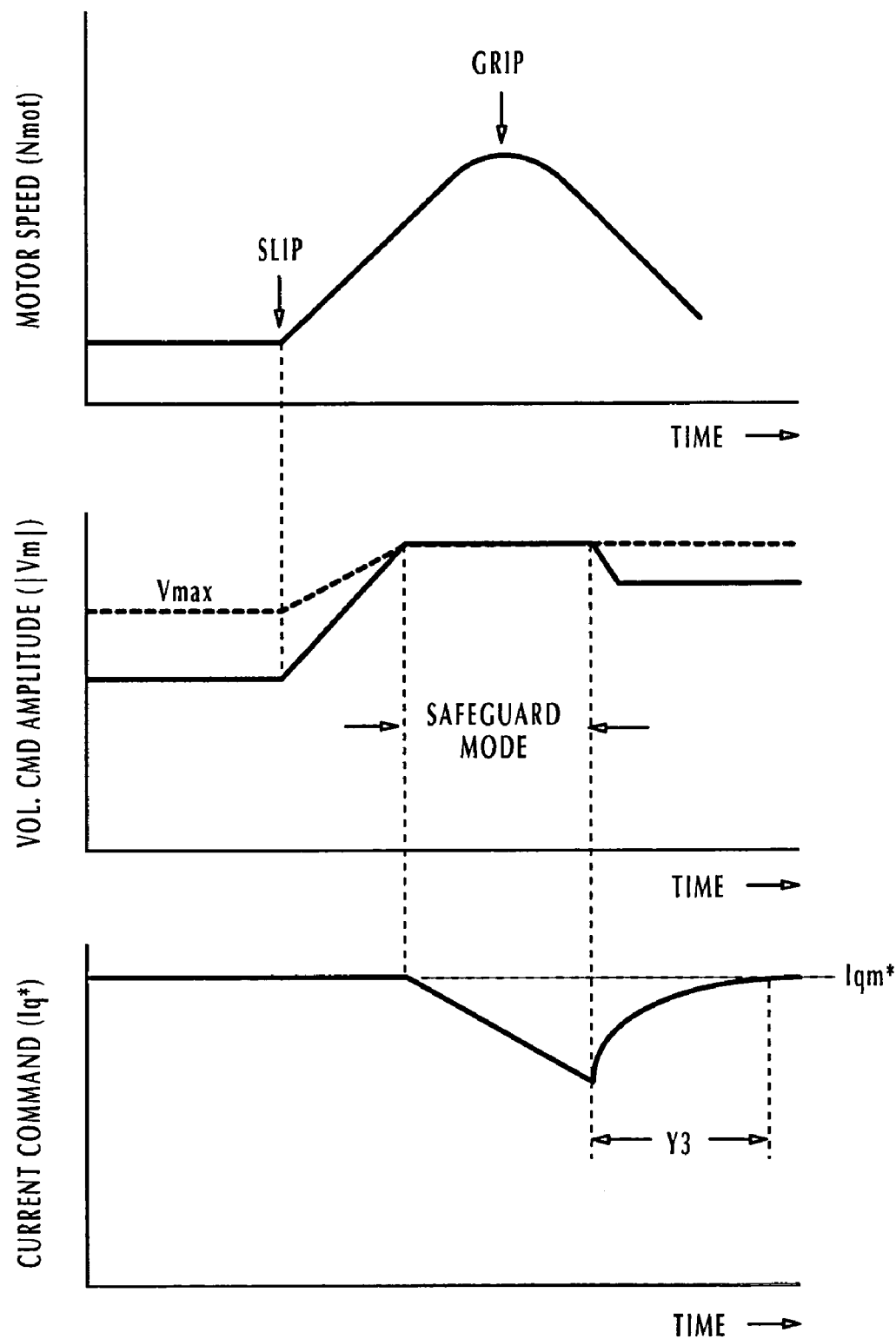
FIG. 8 is a graphic representation of the operating characteristics of the second embodiment of the present invention.

The following is a description of the operation of the motor ECU 1 of FIG. 6 when the vehicle encounters a sudden drop in running load due to braking, causing a wheel slip off road surface. When this occurs, the speed Nmot of traction motor 94 and the voltage command amplitude |Vm| increase rapidly and the upper limit value Vmax also increases until |Vm| reaches Vmax, as shown in FIG. 8. When this occurs, the guard_flag is set ON, setting the motor ECU in a safeguard mode (step 216).

In order to clamp the voltage |Vm| at Vmax, the current command value values Id*, Iq* are set equal to the actual current values Id, Iq, which correspond to Id_A*, Iq_A* of step S205. As a result, the current command values Id*, Iq* decay gradually. When the driven wheels grip on road surface, the voltage command amplitude |Vm| drops below the upper limit Vmax, turning off the guard_flag (step S220). The slow-return process (step S212) is then performed on the command values Id*, Iq* until the value A of counter "cnt" is decremented to zero, so that they slowly increase until they reach the original values Idm*, Iqm* during the interval indicated as Y3 in FIG. 8. If they are allowed to return to the original values Id*, Iq*, which were attained at the instant the operation was shifted to safeguard mode, the voltage command values Vd, Vq would become excessively high at the instant the operation is restored to normal mode. If the running load encounters a sudden increase (i.e., the motor speed value Nmot rapidly drops), slow-return step S212 will be performed in a process inverse to that just described.

The first embodiment of the present invention can be modified by including a pulse width modulator in the current command value corrector 27 for converting the current command value Iq* to a series of modulated pulses.

Figure 9:
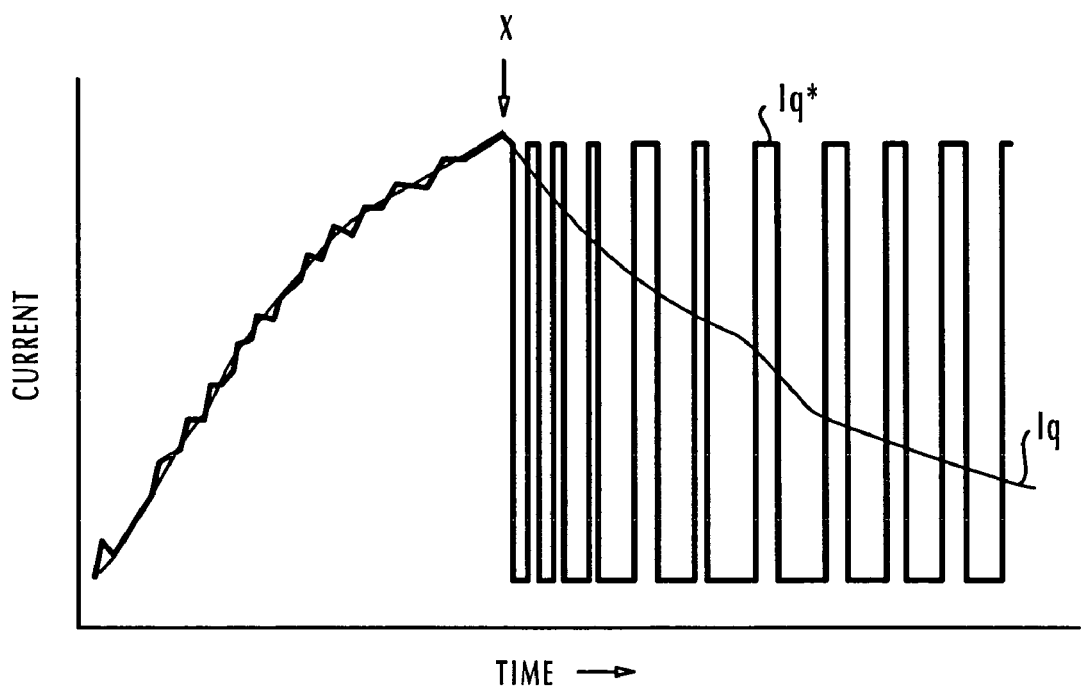
FIGS. 9 and 10 are timing diagrams associated with modified embodiments of the current command corrector of FIG. 2.

A train of constant-rate, variable-width pulses of constant amplitude corresponding to the command value Iq* is generated at the instant |Vm| goes outside of the allowable range and the motor ECU starts operating in a safeguard mode. The width of each pulse is modulated with the correction value K supplied from the safeguard circuit 23. If the safeguard mode is triggered by |Vm| exceeding the upper limit Vmax at an instant indicated by symbol X in FIG. 9, the pulse width is modulated in such a manner that the actual current Iq decreases with time. If the safeguard mode is triggered when |Vm| falls below the lower limit Vmin, the pulse width modulation proceeds in reverse so that the actual current Iq increases with time. The width-modulated pulses are then integrated over time to produce a corrected current command value Iqs*. Thus, the correction of current command value Iq* can be achieved by setting the amplitude of all pulses equal to the current command value which was attained at the instant the voltage |Vm| goes out of the allowable range, modulating their width and integrating the pulses. The advantage of this arrangement is that the corrector 27 can be implemented with simplified circuitry.

Instead of the pulse width modulation technique, pulse amplitude modulation technique can be used for implementing a simplified correction circuit. In this case, the current command value corrector 27 converts the current command value Iq* to a series of amplitude modulated pulses.

Figure 10:
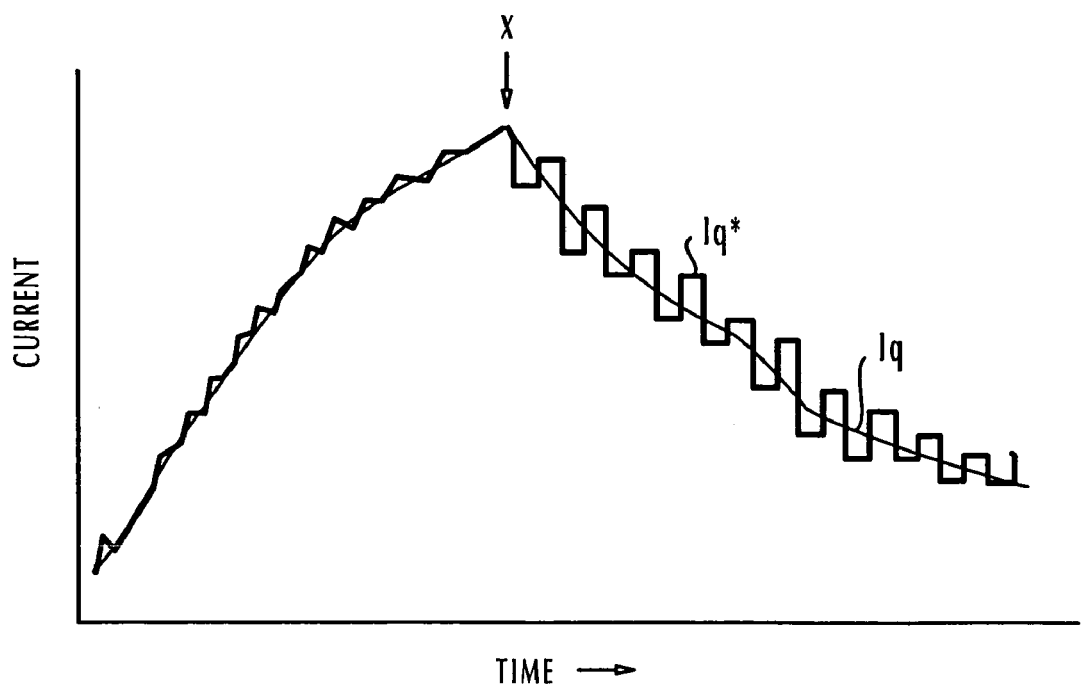

Specifically, a train of constant-rate, constant-width pulses of amplitude corresponding to the command value Iq* is generated at the instant |Vm| goes outside of the allowable range and the motor ECU starts operating in a safeguard mode. Then the amplitude of each pulse is successively modulated with the correction value K supplied from the safeguard circuit 23. If the safeguard mode is triggered by |Vm| exceeding the upper limit Vmax at the instant X in FIG. 10, the pulse amplitude modulation proceeds in such a manner that the actual current Iq decreases with time. If the safeguard mode is triggered when |Vm| falls below the lower limit Vmin, the pulse amplitude modulation proceeds in reverse so that the actual current Iq increases with time. The amplitude-modulated pulses are then integrated over time to produce a corrected current command value Iqs*.

Figure 11:
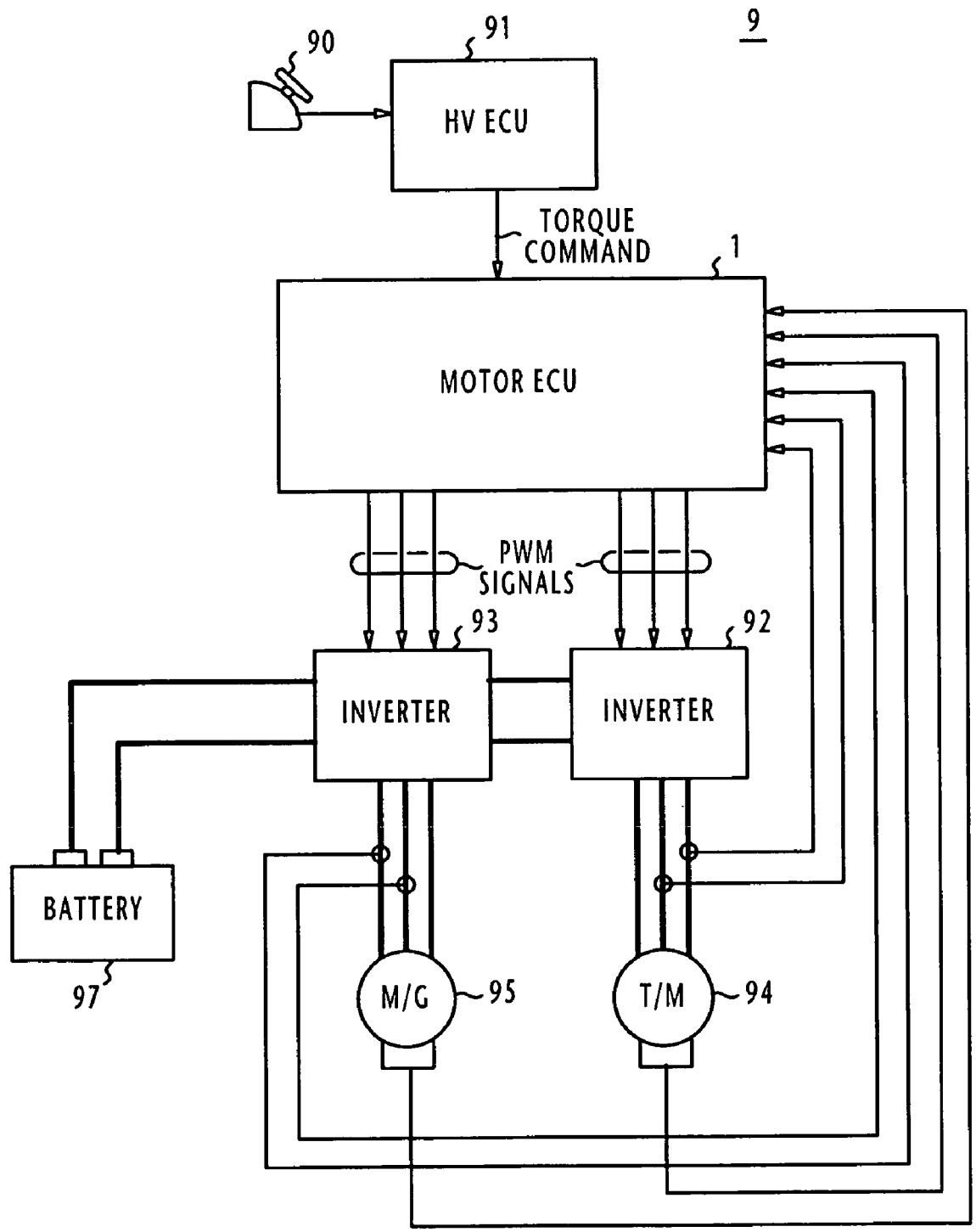
FIGS. 11 to 13 are block diagrams of torque control systems in which the present invention can be used.
Figure 12:
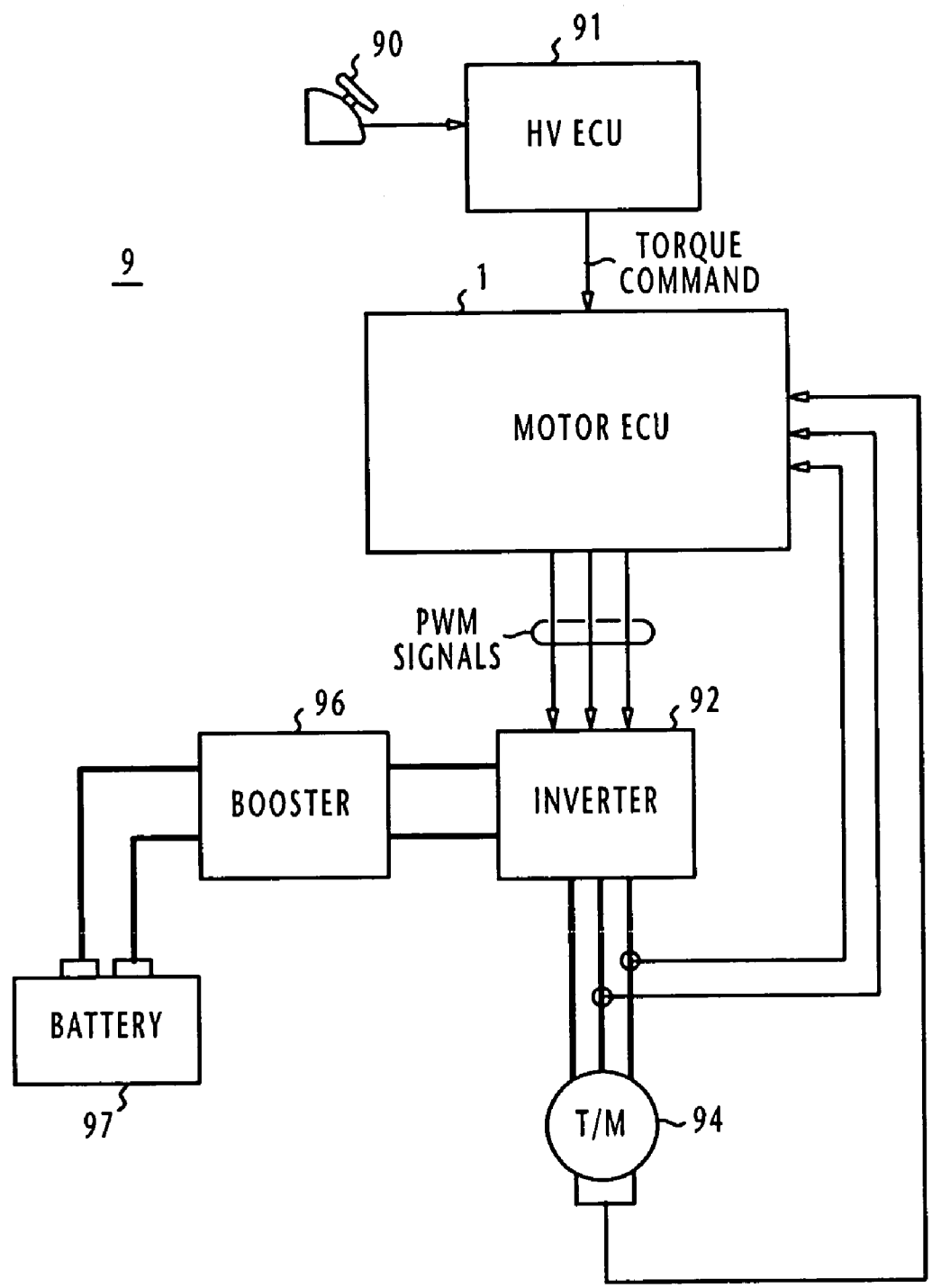
Figure 13:
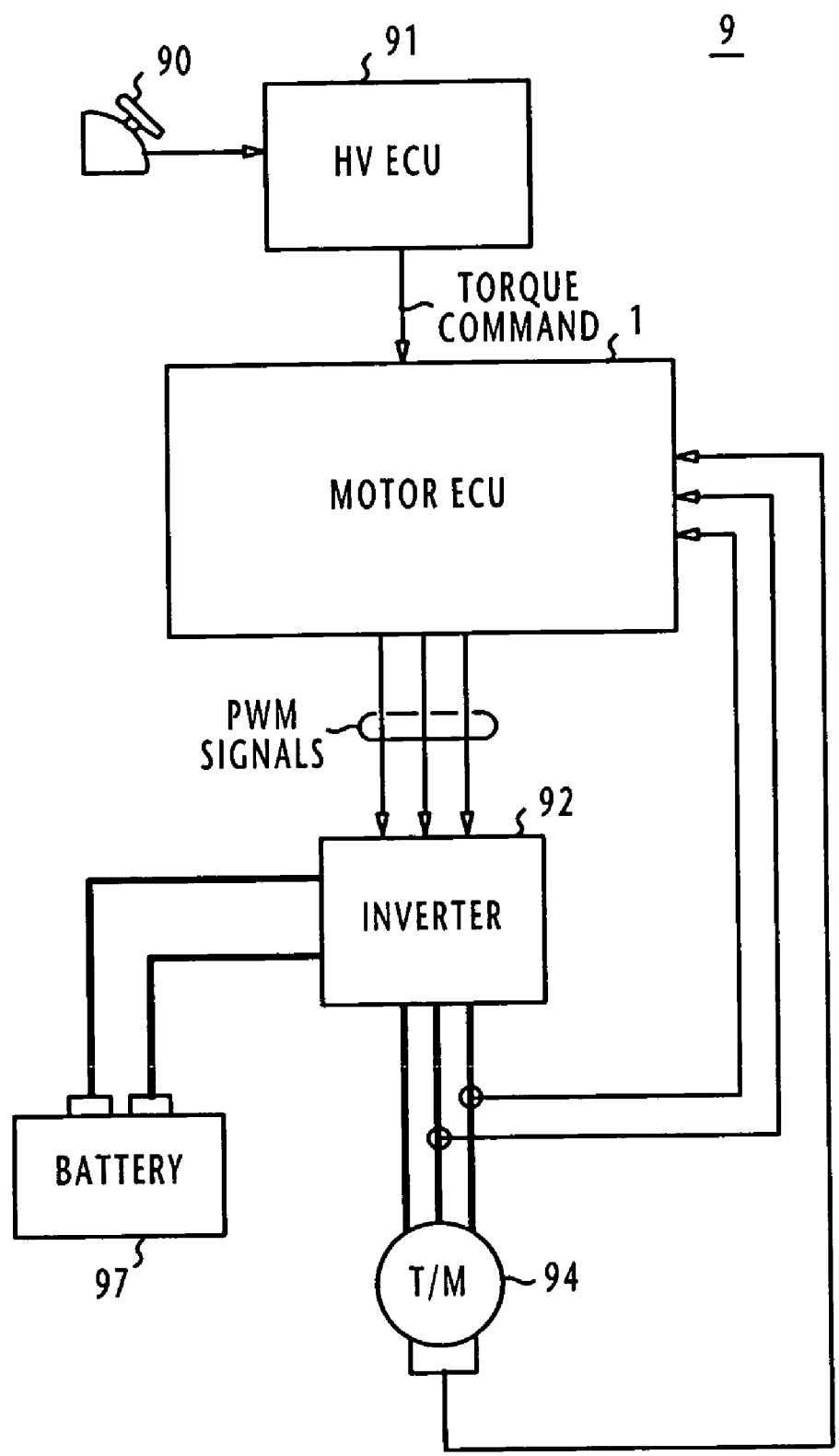

The torque control system of FIG. 1 can be modified as shown in FIGS. 11 to 13. In FIG. 11, the booster 96 of FIG. 1 is removed. In FIG. 12, the inverter 93 and motor-generator 95 of FIG. 1 are eliminated and in FIG. 13, the booster 96, inverter 93 and motor-generator 95 are dispensed with.

While mention has been made of a hybrid vehicle, the present invention could equally be applied to electric vehicles and fuel-cell vehicles.

What is claimed is:

1. A control system for regulating voltages supplied to a traction motor of a vehicle, comprising:
   a current command determiner determining a current command value to be given to the traction motor based on an externally supplied torque command value and a load value representative of a running load of the vehicle;
   a voltage command calculator determining a voltage command value to be given to said motor so that a difference between the current command value and an actual current value of said motor are converged to zero;
   a range determiner determining an allowable voltage range having a lower limit and an upper limit based on said load value and a physical quantity representing an operating condition of said motor; and
   safeguard circuitry comparing the voltage command value with said lower and upper limits and preventing said voltage command value from becoming either smaller than said lower limit or greater than said upper limit.

2. The control system of claim 1, wherein said safeguard circuitry comprises:
   means for generating a current correction value when said voltage command value is becoming either smaller than said lower limit or greater than said upper limit; and
   a current corrector correcting said current command value according to said current correction value.

3. The control system of claim 2, wherein said voltage command calculator comprises:
a feedback control circuit independently generating a d-axis voltage command value and a q-axis voltage command value based on said current command value and actual currents of said traction motor; and
a feedforward control circuit processing said d-axis and q-axis voltage command values using non-interference terms caused by cross-coupled d-axis parameters and q-axis parameters.

4. The control system of claim 2, wherein said current corrector is configured to correct stepwisely correct said current command value.

5. The control system of claim 2, wherein said current corrector is configured to correct said current command value in the form of pulses.

6. The control system of claim 2, wherein said safeguard circuitry is configured to control said corrected current command value when said voltage command value returns to said allowable voltage range by causing the corrected current command value to gradually approach a value which was attained at the instant said voltage command value was becoming smaller than said lower limit or greater than said upper limit.

7. The control system of claim 1, wherein said safeguard circuitry is configured to control said current command value by:
setting an initial value of said current command value equal to said actual current value at the instant said voltage command value is becoming smaller than said lower limit or greater than said upper limit, and
further controlling said current command value when said voltage command value returns to said allowable voltage range by causing said current command value to gradually approach a value which was attained at the instant said voltage command value was becoming smaller than said lower limit or greater than said upper limit.

8. The control system of claim 1, wherein said load value is representative of the speed of rotation of said traction motor.

9. The control system of claim 5, wherein said current corrector is configured to correct said current command value by generating constant-rate pulses of constant amplitude equal to said current command value when said voltage command value is becoming either smaller than said lower limit or greater than said upper limit and modulating the width of said pulses according to said current correction value.

10. The control system of claim 5, wherein said current corrector is configured to correct said current command value by generating constant-rate pulses of constant width when said voltage command value is becoming either smaller than said lower limit or greater than said upper limit and modulating the amplitude of said pulses according to said current correction value, said amplitude being initially equal to said current command value.

11. The control system of claim 1, wherein said current command determiner comprises a mapping table, in which a plurality of torque command values and a plurality of running load values of said vehicle are mapped to a plurality of predetermined current command values of said traction motor, for determining one of the predetermined current command values based on an actual torque command value and an actual running load of said vehicle, and
wherein said range determiner comprises a mapping table, in which a plurality of physical quantities associated with an operating condition of said motor and said running load values of said vehicle are mapped to a plurality of predetermined allowable voltage ranges and determining one of said predetermined allowable voltage ranges based on an actual physical quantity associated with said operating condition and said actual running load of said vehicle.

12. The control system of claim 1, wherein said operating condition of said motor includes an actual speed of rotation of said motor.

13. A method of regulating a voltage supplied to a traction motor of a vehicle, comprising steps of:
determining a current command value to be given to said traction motor based on a torque command value and a load value representative of running load of said vehicle;
calculating a voltage command value to be given to said traction motor so that a difference between said current command value and an actual current value of said traction motor is converged to zero;
determining an allowable voltage range having a lower limit value and an upper limit value based on said load value and a physical quantity associated with an operating condition of said motor; and
comparing said voltage command value with said lower limit value and said upper limit value and setting a safeguard on the voltage command value when the voltage command value is becoming either smaller than said lower limit value or greater than said upper limit value.

14. The method of claim 13, wherein said comparing step further comprises the steps of:
generating a current correction value when said voltage command value is becoming either smaller than said lower limit or greater than said upper limit; and
correcting said current command value according to said current correction value.

15. The method of claim 13, wherein the step of calculating the voltage command value comprises steps of:
independently generating a d-axis voltage command value and a q-axis voltage command value based on said current command value and actual currents of said traction motor; and
processing said d-axis and q-axis voltage command values using non-interference terms caused by cross-coupled d-axis parameters and q-axis parameters.

16. The method of claim 14, wherein the step of correcting said current command value stepwisely corrects said current command value.

17. The method of claim 14, wherein the step of correcting said current command value corrects said current command value in the form of pulses.

18. The method of claim 14, wherein said comparing step further comprises a step of controlling said corrected current command value when said voltage command value returns to said allowable voltage range by causing said corrected current command value to gradually approach a value which was attained at the instant said voltage command value was becoming smaller than said lower limit or greater than said upper limit.

19. The method of claim 13, wherein said comparing step further comprises steps of:
setting an initial value of said current command value equal to said actual current value at the instant said voltage command value is becoming smaller than said lower limit or greater than said upper limit, and causing said current command value to gradually approach a value, which was attained at the instant said voltage command value was becoming smaller than said lower limit or greater than said upper limit, when said voltage command value returns to said allowable voltage range.

20. The method of claim 13, wherein said load value is representative of a speed of rotation of said traction motor.

21. The method of claim 17, wherein the step of correcting said current command value further comprises steps of:
generating constant-rate pulses of constant amplitude equal to said current command value when said voltage command value is becoming either smaller than said lower limit or greater than said upper limit; and
modulating the width of said pulses according to said current correction value.

22. The method of claim 17, wherein the step of correcting said current command value further comprises steps of:
generating constant-rate pulses of constant width when said voltage command value is becoming either smaller than said lower limit or greater than said upper limit; and
modulating the amplitude of said pulses according to said current correction value, said amplitude being initially equal to said current command value.

23. The method of claim 13, wherein the step of determining said current command further comprises steps of:
mapping a plurality of torque command values and a plurality of running load values of said vehicle to a plurality of predetermined current command values of said traction motor; and
determining one of the predetermined current command values based on an actual torque command value and an actual running load of said vehicle, and
wherein the step of determining said allowable voltage range further comprises steps of:
mapping a plurality of physical quantities associated with an operating condition of said motor and said running load values of said vehicle to a plurality of predetermined allowable voltage ranges; and
determining one of said predetermined allowable voltage ranges based on an actual physical quantity associated with said operating condition and said actual running load of said vehicle.

24. The method of claim 13, wherein said operating condition of said motor includes an actual speed of rotation of said motor.

* * * * *